United States Patent
Righele

[11] Patent Number: 6,123,613
[45] Date of Patent: Sep. 26, 2000

[54] MACHINE FOR PRODUCING SAUSAGES WITH TWISTED CASING

[76] Inventor: Giovanni Battista Righele, Via Tiziano, 5 - 36010 Zane' (Vicenza), Italy

[21] Appl. No.: 09/048,755

[22] Filed: Mar. 26, 1998

[30] Foreign Application Priority Data

Mar. 26, 1997 [IT] Italy ................................. MI97A0709

[51] Int. Cl.⁷ ................................................ A22C 11/10
[52] U.S. Cl. ............................................. 452/31; 452/48
[58] Field of Search ......................................... 452/47, 48

[56] References Cited

U.S. PATENT DOCUMENTS

| | | |
|---|---|---|
| 3,115,668 | 12/1963 | Townsend . |
| 3,115,688 | 12/1963 | Smith . |
| 4,112,546 | 9/1978 | Müller ........................................ 452/47 |
| 5,092,813 | 3/1992 | Kasai et al. ................................ 452/47 |
| 5,145,450 | 9/1992 | Staudenrausch et al. ................. 452/47 |
| 5,788,563 | 8/1998 | Nakamura et al. ........................ 452/47 |

Primary Examiner—Willis Little
Attorney, Agent, or Firm—Quarles & Brady LLP

[57] ABSTRACT

Machine to produce sausages with twisted casing, comprising a feeding pump for minced meat, a skin dressing tube located at the exit of said pump in order to sustain a flexible casing and to consent the introduction of meat into the casing itself for the formation of a continuous sausage. A device of separation and feed of the sausage provided with mobile pincers that can be brought near to each other is located at the exit of the skin dressing tube in order to advance the sausage and to nip the casing so as to form a squeezing point between each sausage downstream and the rest of the sausage upstream. The machine provides for controlling means to produce the rotation of the skin dressing tube for the twisting of the casing around said squeezing point in such a way as to obtain a separation tang between a sausage downstream and the rest of the sausage upstream. Said controlling means are synchronized with the movement of said pincers in order to control the rotation of said skin dressing tube only for a predetermined period of time between the formation of a squeezing point and that of the subsequent squeezing point. The synchronization is obtained through the aid of a sensor of position.

15 Claims, 8 Drawing Sheets

MACHINE FOR PRODUCING SAUSAGES WITH TWISTED CASING

DESCRIPTION

The present industrial invention refers to a machine for producing sausages with twisted casing.

Machines for the production of sausages are known, in which a filling pump feeds a constant and continuous flow of minced meat into a flexible tubular envelop (the so called "casing") in such a way so as to form a continuous sausage that is then separated into single sausages by nipping periodically and at the same time twisting this tubular envelop.

In machines of this type, one of which is described in U.S. Pat. No. 3,115,668, a gathered casing fit on a skin dressing tube located at the exit of the pump is filled and is pushed forward by the pressure of the meat being fed by the same pump. A separation and feed device provides to the advancement of the continuous sausage thus formed, for example by means of a pair of chains arranged on two opposite sides of the sausage and provided at least with a pair of co-operating pincers, that provide to nip periodically the sausage itself in such a way as to define a squeezing point that separates the sausage thus formed downstream of the pincers themselves and the remaining continuous sausage.

At the same time the skin dressing tube is rotated in a continuous way in order to cause, in association with the squeezing of the sausage, a desired twist of the casing so as to obtain a separation tang between the sausage downstream and the sausage upstream.

An inconvenient related to these known machines is represented by the fact that it is extremely difficult to obtain skin dressed and twisted sausages using a natural casing.

In view of this state of the art, object of the present invention is to realise a machine to produce sausages with twisted casing allowing to solve the aforementioned inconvenient.

According to the present invention, a machine is thus realised for producing sausages with twisted casing, comprising a pump feeding minced meat, an skin dressing tube located at the exit of said pump for sustaining a flexible casing and consenting the introduction of meat into the casing itself for the formation of a continuous sausage, a device for the separation and feed of the sausage provided with mobile pincers that can be brought near to each other in order to nip the casing and forming in this way a squeezing point between one sausage downstream and the rest of the sausage upstream, and controlling means for causing the rotation of the skin dressing tube for the twisting of the casing around said throttling point in such a way as to obtain a separation tang between a sausage downstream and the rest of the sausage upstream, characterised in that said controlling means are synchronised with the movement of said pincers in order to control the rotation of said skin dressing tube only for a predetermined period of time between the formation of a squeezing point and that of the subsequent squeezing point.

A sensor is preferably associated with the separation and feed device for detecting the passage of the pincers at a position near the one of the squeezing of the casing and for controlling the start of the rotation of the skin dressing tube with a predefined delay corresponding at least to the time necessary for the pincers to reach the position of the casing squeezing.

With the machine according to the invention, thanks to the intermittent rotation of the skin dressing tube, it is possible to obtain the desired amount of twist of the casing around each portion of sausage meat without subjecting the casing itself to mechanical stresses that could produce the rupture of the casing, especially if this is made of a natural material.

At the same time the production of sausages of variable length is made possible without having to intervene on the rotation of the skin dressing tube. Indeed, it is sufficient to vary the distance between the pincers and, thanks to the sensor, the rotation of the skin dressing tube adjusts automatically to the new situation thus setting off the twisting operation with the same predetermined delay and for a time that can be regulated exclusively as a function of the number of turns required.

These and other features of the present invention will be rendered evident by the following detailed description of a preferred embodiment thereof, that is illustrated as non-limiting example in the enclosed drawings, where:

Figure 1:
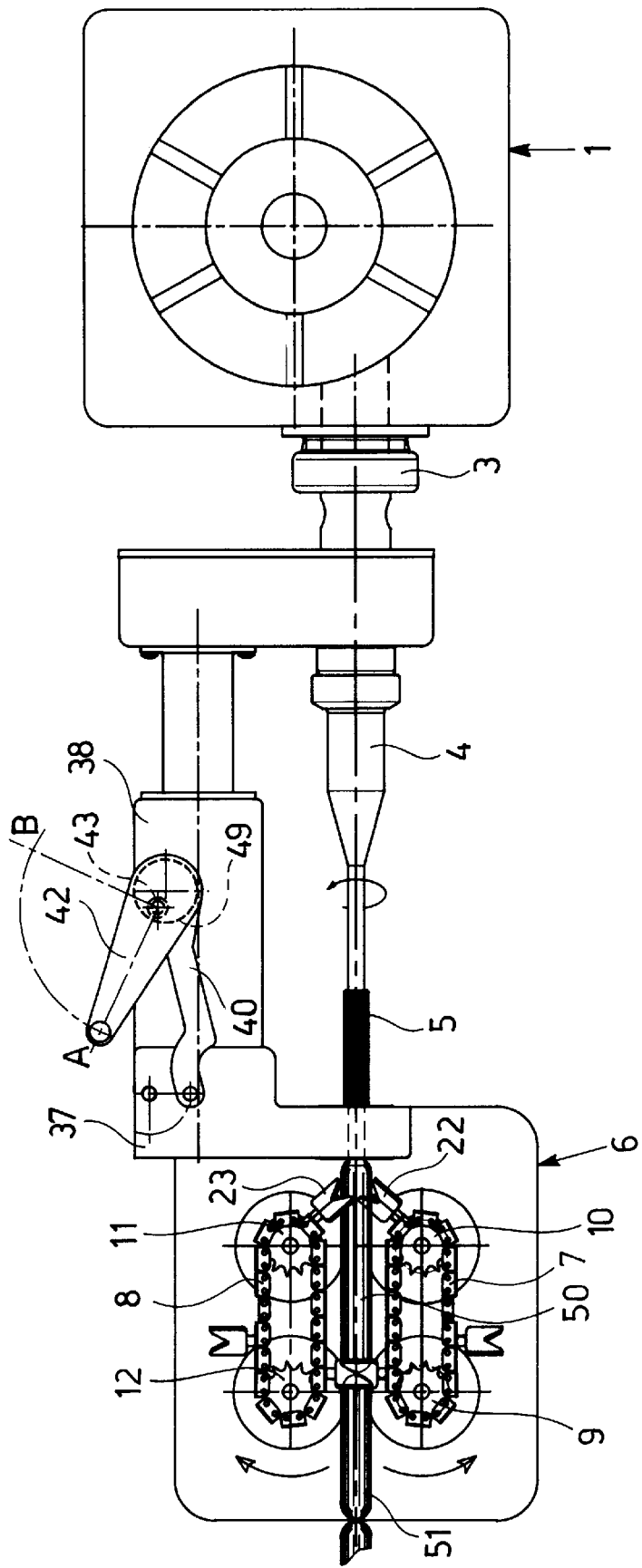
FIG. 1 is a schematic top plan view of a machine according to the invention.
Figure 8:
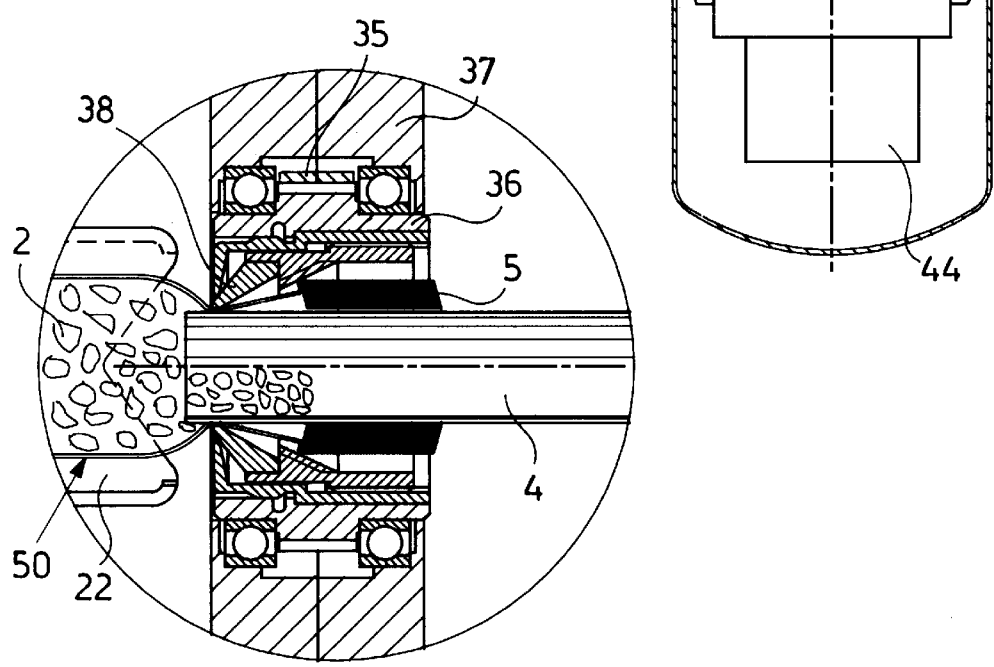
FIG. 8 shows a magnified detail in vertical section of the exit zone of a rotating skin dressing tube that provides for the formation of the sausage.
Figure 7:
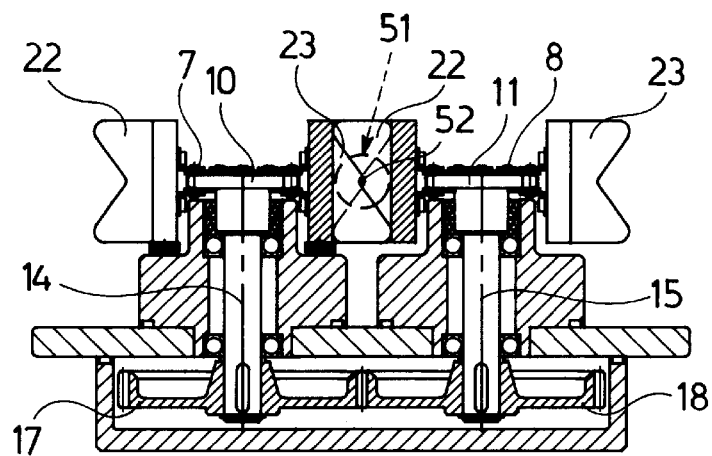
FIG. 7 shows a section of the device of separation and feed along line VII—VII of FIG. 6.

As shown in FIG. 1, the machine according to the invention comprises a feed pump 1, in particular of the rotary type with blades, known per se, that receives minced meat from a loading hopper (not shown) and outputs it at constant velocity through an exit outlet 3. This outlet 3 is connected to a skin dressing tube 4 on which a gathered casing 5 is arranged. The minced meat 2 pumped by the casing dressing pump 1 fills and pushed forward the casing 5 in such a way so as to form a continuous sausage 50 (FIG. 8).

Figure 3:
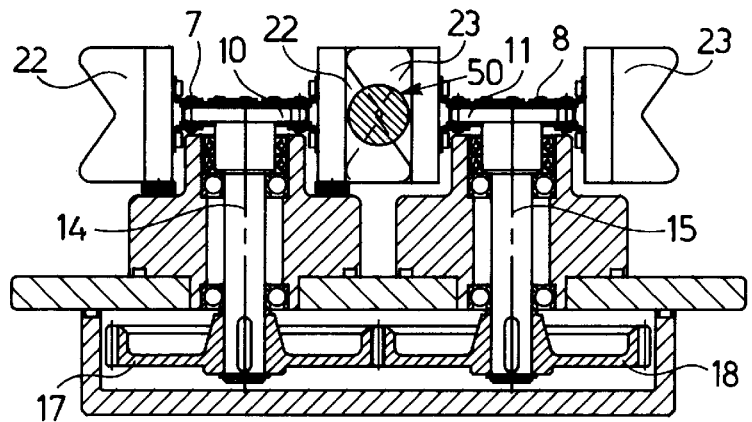
FIG. 3 shows a section along line III—III of FIG. 2.
Figure 2:
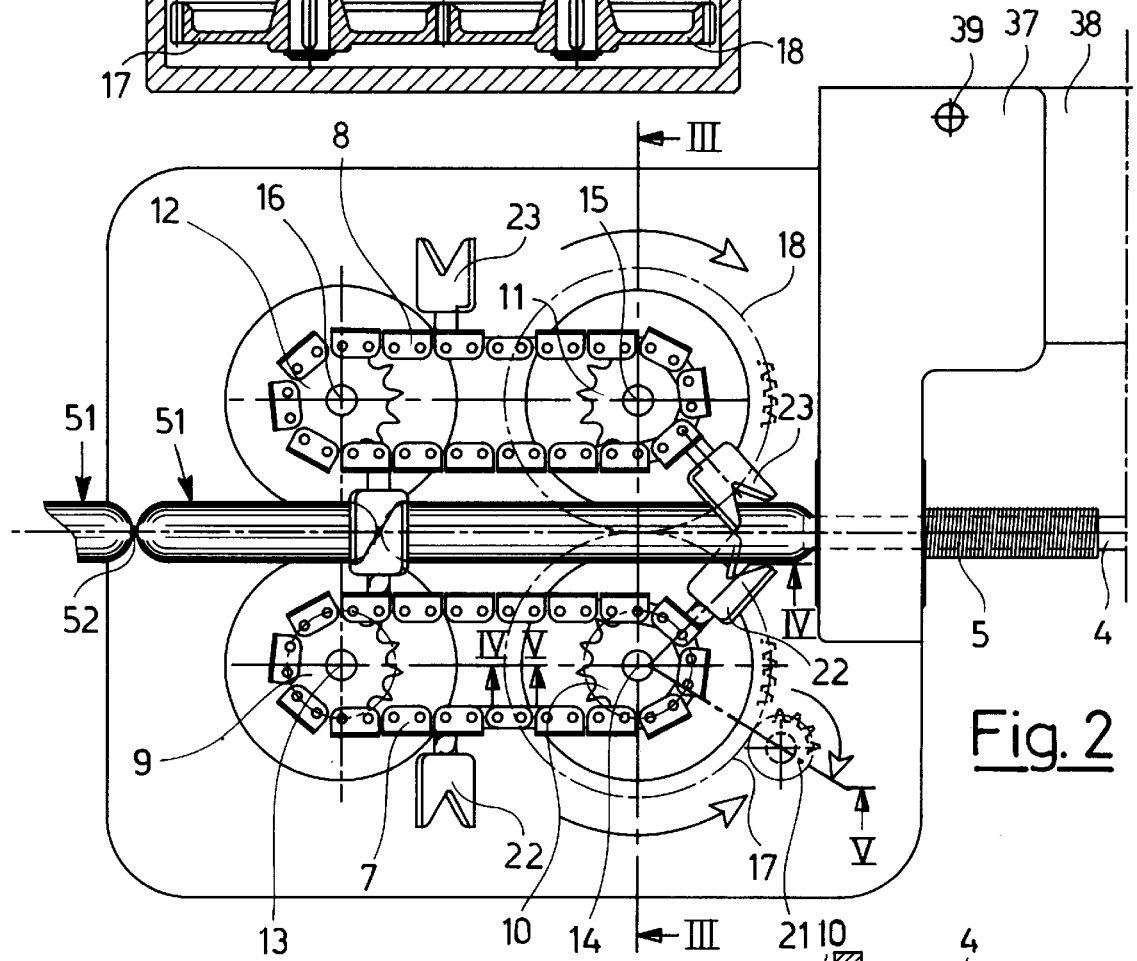
FIG. 2 shows a magnified top plan view of the device for the separation and feed of the sausage found in said machine.
Figure 5:
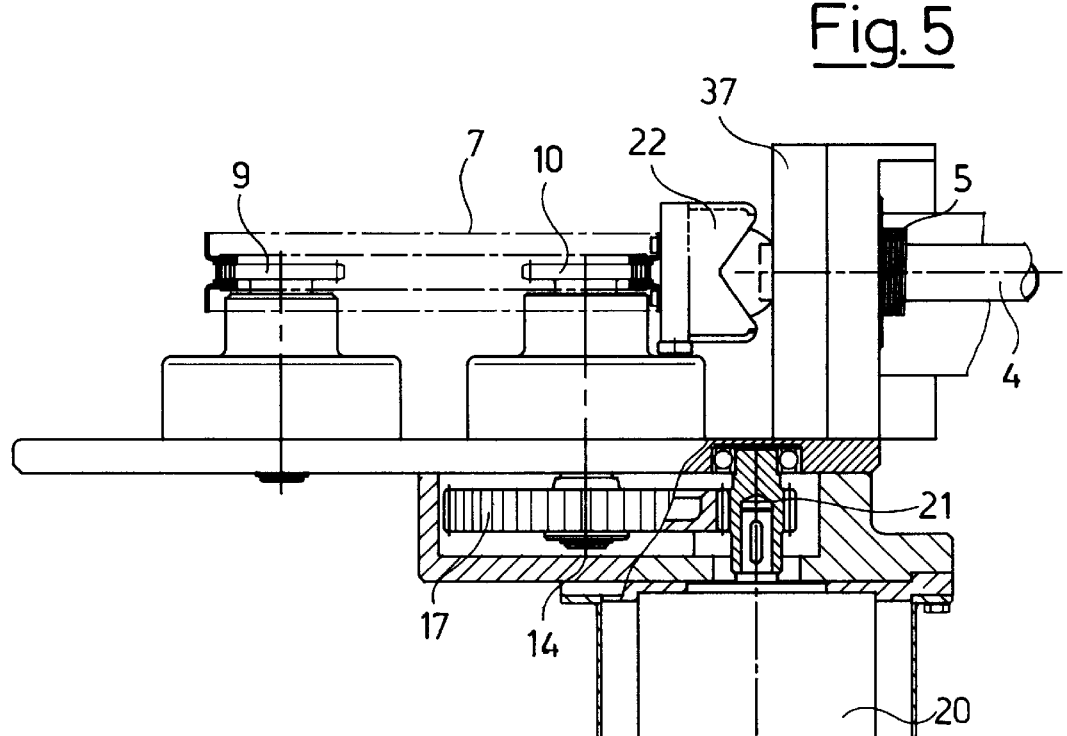
FIG. 5 shows in a side view, partially sectioned according to line V—V of FIG. 2, the motorization means of the separation and feed device.

The sausage 50 is subsequently engaged by a device of separation and feed 6 comprising two chains 7, 8 looped and positioned on opposite sides of the sausage. As it can be seen more clearly in FIGS. 2, 3 these chains 7, 8 mesh respectively with two pairs of toothed pulleys 9, 10 and 11, 12 placed on respective vertical shafts 13, 14, 15, 16. Respective equal meshes 17, 18 engaged with each other are fixed on the vertical shafts 14, 15. The mesh 17 is also engaged with an additional mesh 21 with smaller diameter that is set in rotation by a motor 20, as shown in FIG. 5.

Chains 7, 8 are provided with respective pincers 22, 23, that co-operate with each other two by two in order to nip periodically the sausage 50 in such a way as to form a squeezing point 52 between a series of sausages downstream and the continuous sausage upstream.

Right afterwards, the skin dressing tube 4 starts rotating thus accomplishing the twist of the casing 5 upstream of the squeezing point 52.

Figure 4:
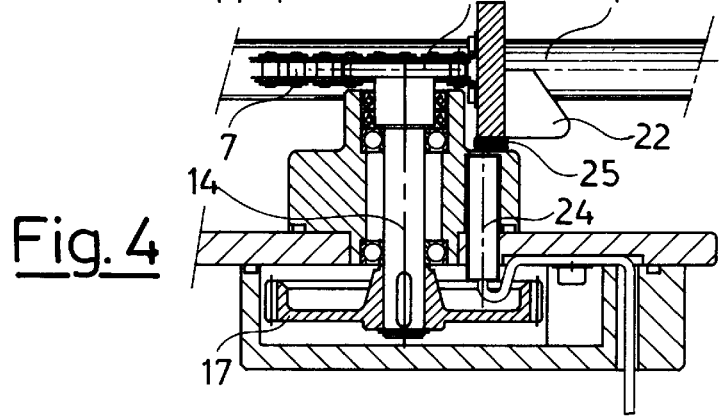
FIG. 4 shows a section along line IV—IV of FIG. 2.
Figure 6:
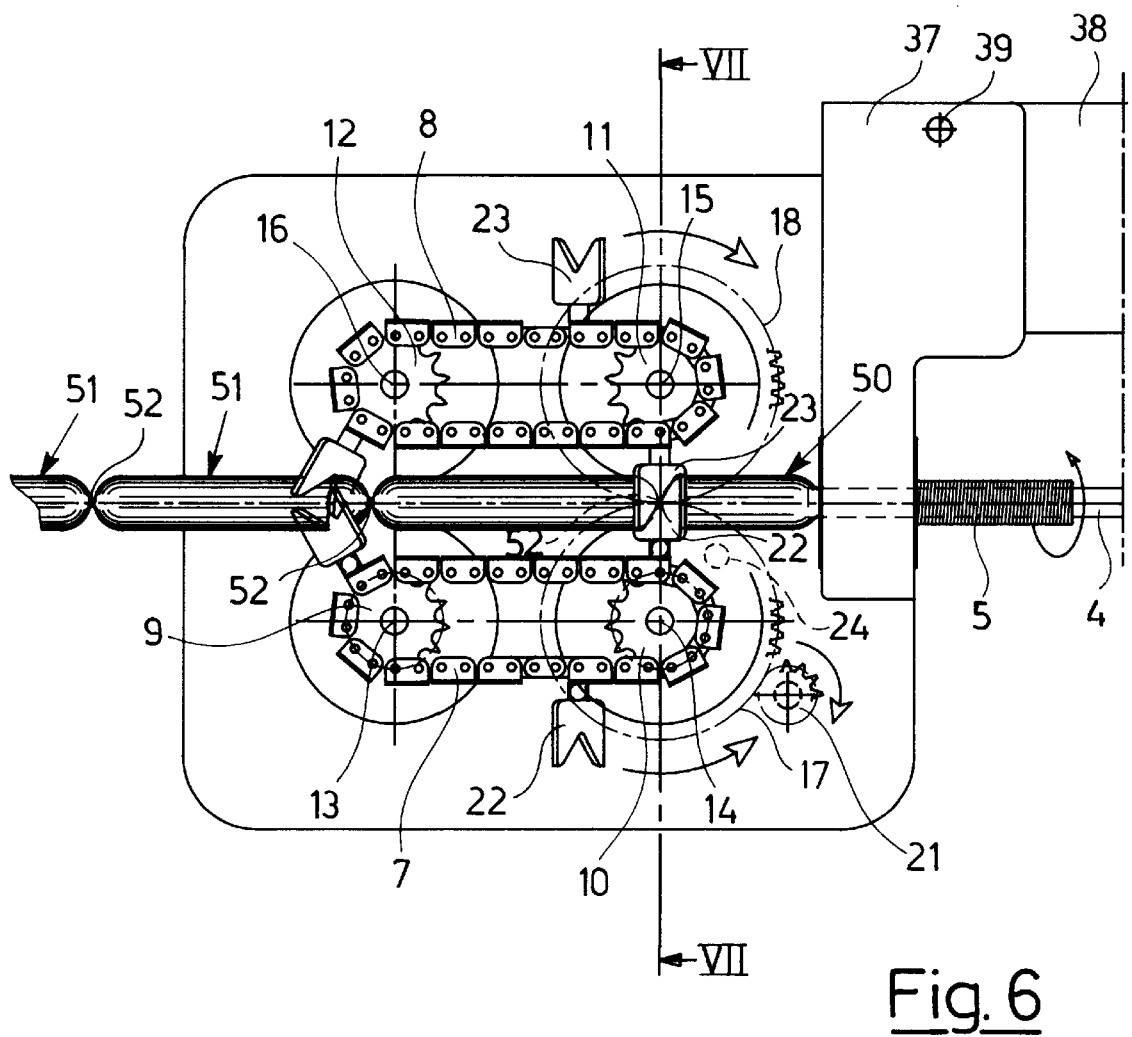
FIG. 6 shows a magnified top plan view of the separation and feed device in the position of the sausage nipping.

The beginning of the rotation of the skin dressing tube 4 is controlled by a proximity sensor 24 (FIG. 4), placed near the shaft 14, that is sensitive to the passage of a metallic disc 25 located under each pincers 22, when this is advanced with respect to the position of squeezing of the sausage, corresponding to section line VII—VII of FIG. 6.

Figure 13:
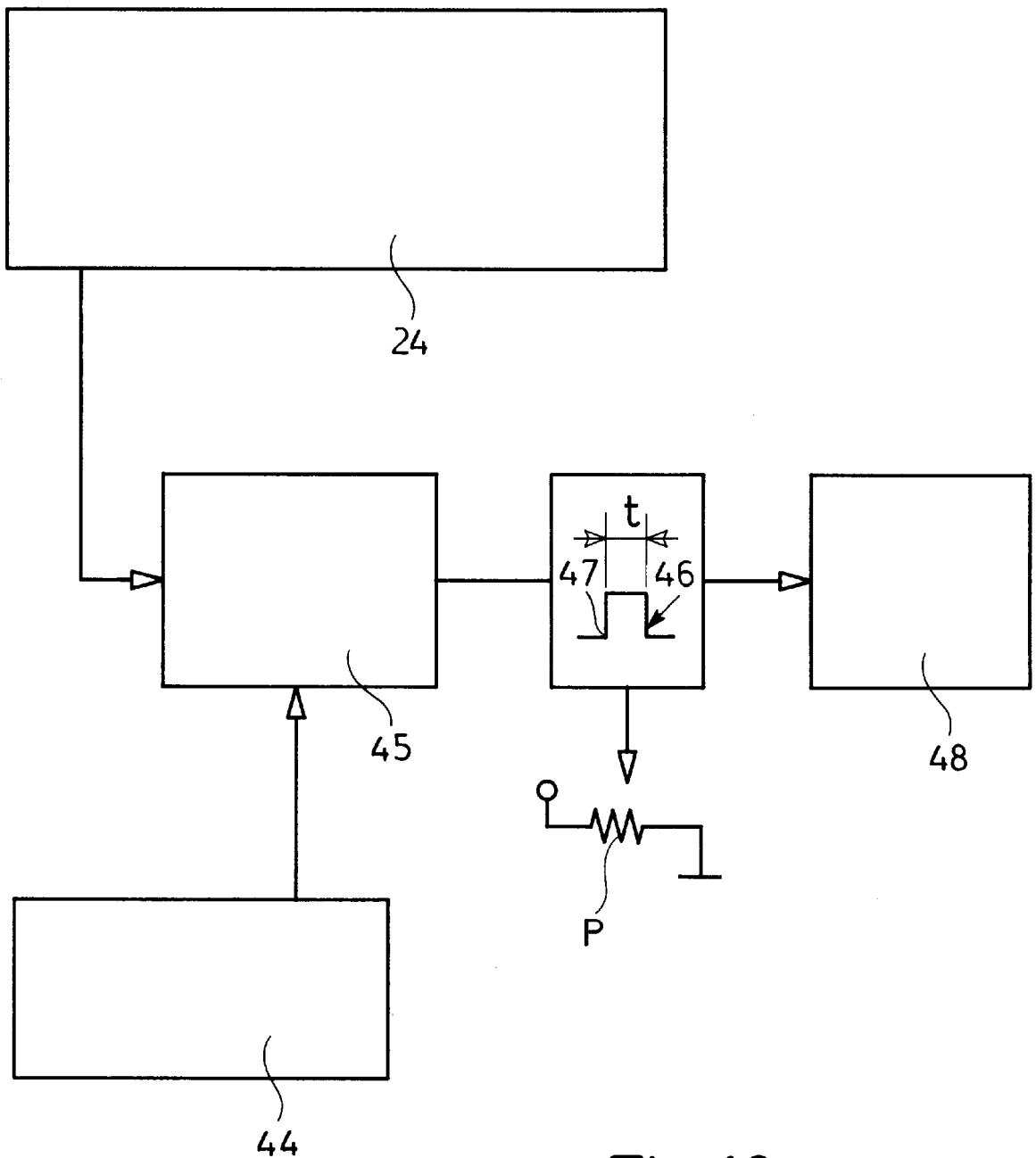
FIG. 13 shows a block scheme of the device for the control and start of the skin dressing tube rotation.

As illustrated by the block scheme of FIG. 13, when the position sensor 24 detects the passage of the pincers 22, a velocity-delay converter 45 combines the information on the velocity of rotation of the chains 7, 8 provided by a tachometric dynamo 44 connected to the motor 20 (FIG. 5) with those provided by the sensor 24, in order to generate a start signal 46 for a motor 48 suitable to set the skin dressing tube 4 into rotation. The starting moment 47 of the signal 46 is calculated in such a way as to coincide with the one in which the pincers 22, 23 will engage with each other. The duration of the time t of the start of motor 48 is in turn regulated externally through the activation of a potentiometer P.

Figure 10:
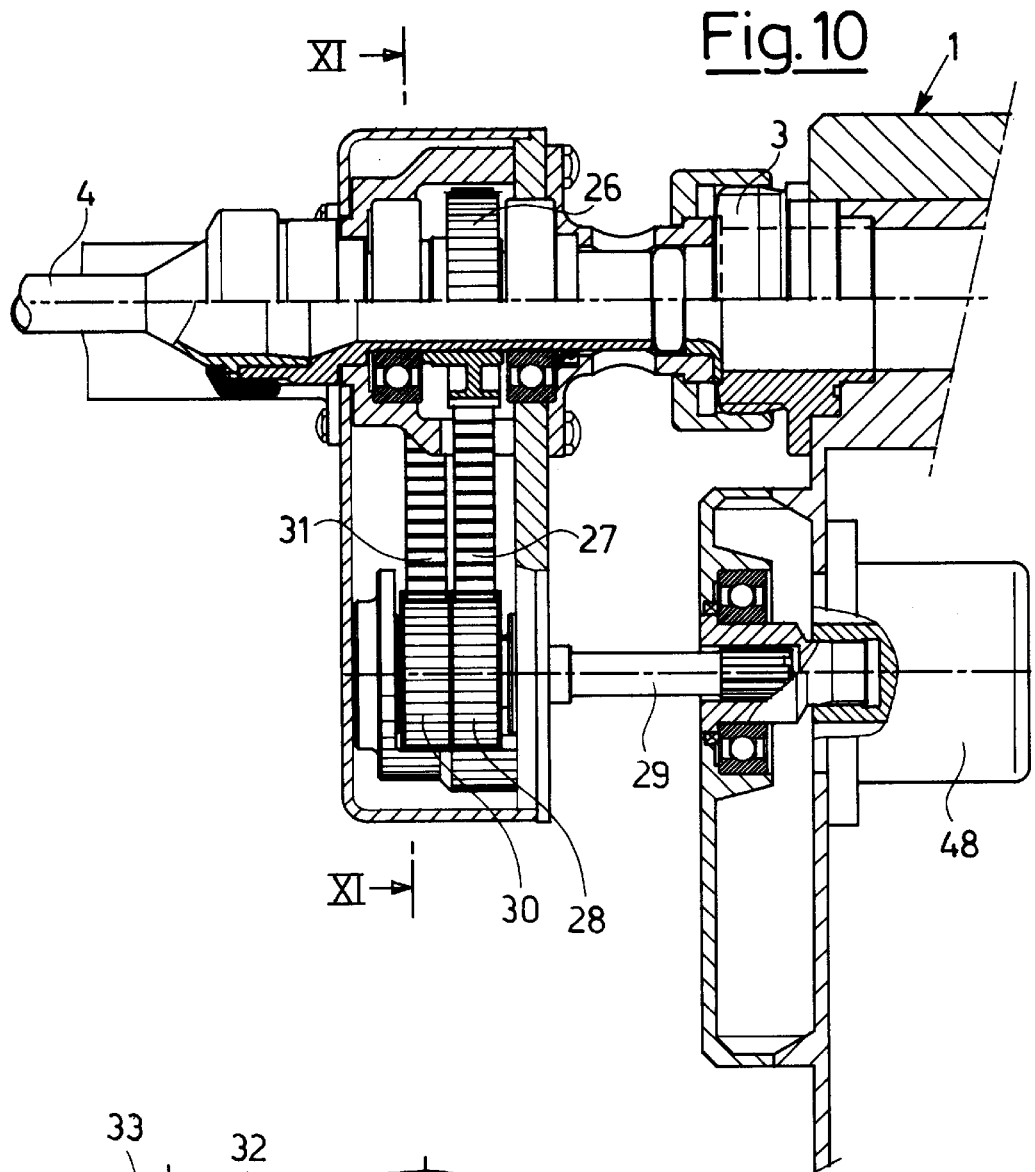
FIG. 10 shows a magnified view, partially in vertical section, of part of said means of motion transmission.
Figure 11:
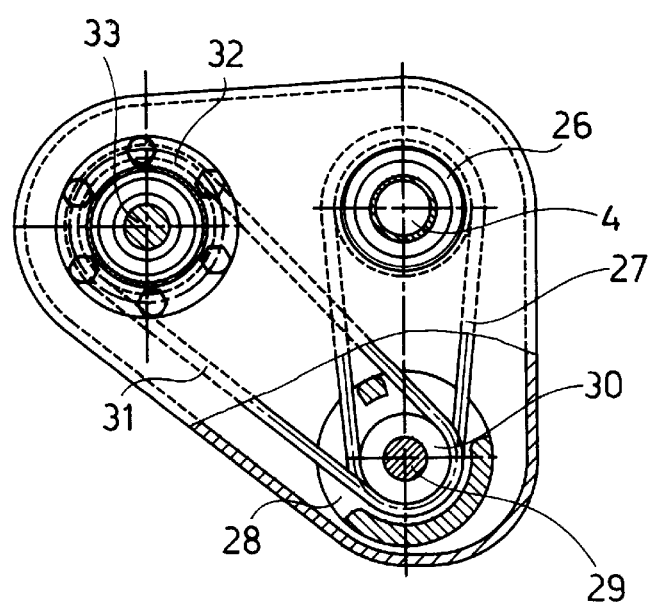
FIG. 11 shows a section along line XI—XI of FIG. 10.

As shown in FIGS. 10 and 11, the motor 48 sets in rotation a shaft 29, on which a toothed pulley 28 is fixed, which through a toothed belt 27 rotates another pulley 26 fixed to the skin dressing tube 4, that is thus set in rotation.

Figure 9:
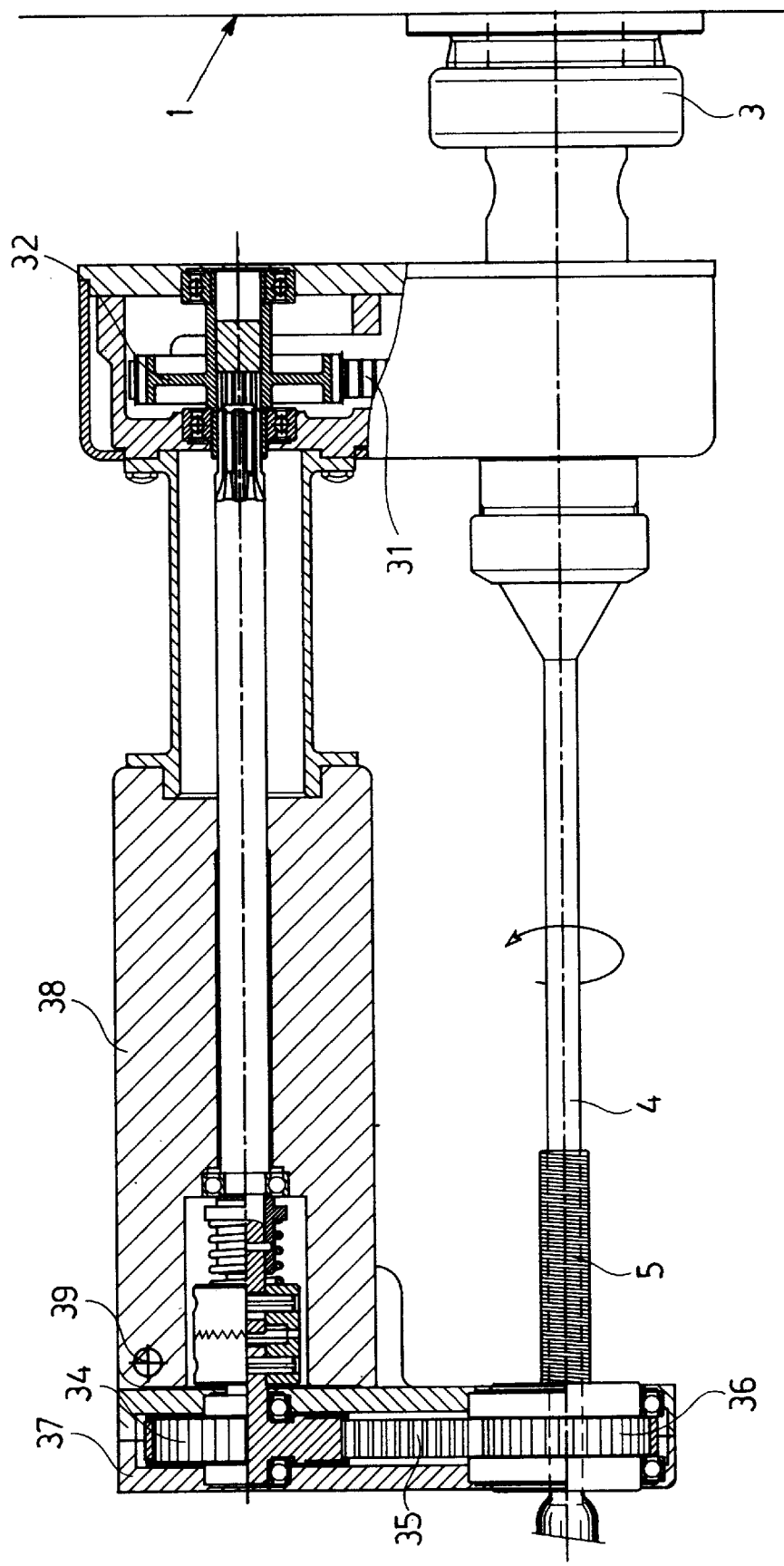
FIG. 9 shows a magnified view, partially in horizontal section, of means of motion transmission that provide to the rotation of the skin dressing tube.

Another pulley 30 is also attached to the transmission-shaft 29, that through a toothed belt 31 sets in rotation a toothed pulley 32 fixed to a transmission-shaft 33 parallel to the skin dressing tube 4 (FIG. 9).

At the opposite end of this shaft 33 with respect to the one where there is the toothed pulley 32 another pulley 34 is fixed which sets in rotation through another toothed belt 35 an additional pulley 36 that is turningly housed into a box arm 37 fixedly mounted to the separation and feed device 6 and that rotates fixedly with the exit end of the skin dressing tube 4 (FIG. 8) thanks to the engagement created by a rubber packing 38 in such a way as to allow the sliding of the casing 5 between said packing 38 (FIG. 8) and the skin dressing tube 4 during the filling of the casing 5.

Figure 12:
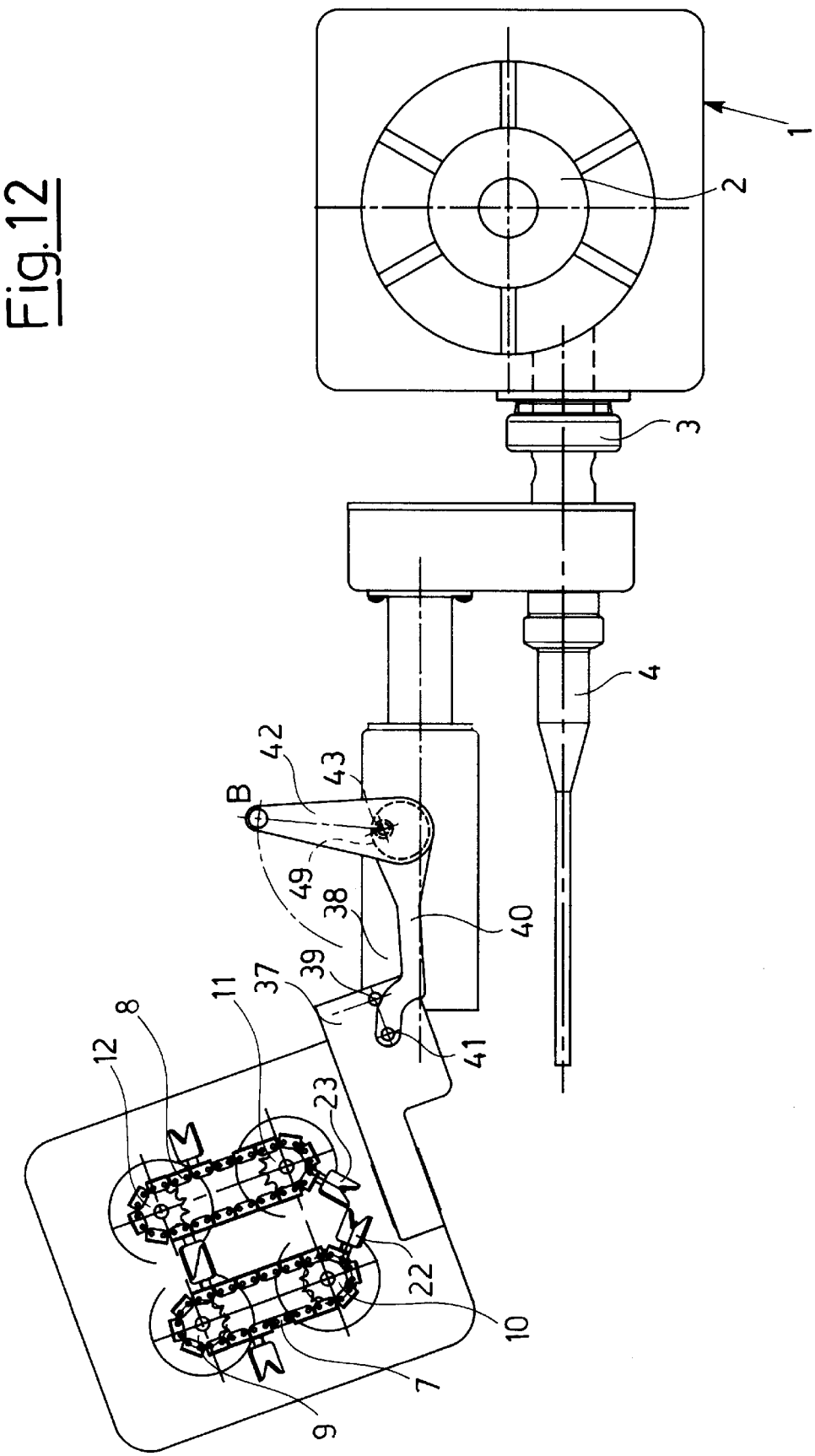
FIG. 12 is a top plan view of a machine according to the invention that is ready to be loaded with a casing on the skin dressing tube.

As it is illustrated in FIGS. 1 and 12, the arm 37 is hinged to a body 38 at a point 39. This arm 37 is also connected to the body 38 by means of a connecting rod 40, one end of which is pivoted in 41 to the arm 37, while the other is rotatably mounted on a cylindrical hub 44 eccentrically fixed to a manoeuvring lever 42 hinged in 43 to the body 38.

When the lever 42 is in position A (FIG. 1), the arm 37 is engaged with the skin dressing tube 4; when instead the lever 42 is in the position B (FIG. 12), the same lever causes the disengagement of the arm 37 from the skin dressing tube 4 through the connecting rod 40. This allows an easy loading of the gathered casing 5 on the skin dressing tube 4 during the phase of preparation of the machine.

To sum up, the machine as a complex works in this way.

As a first operation, the front of the machine is opened as shown in FIG. 12 in order to accomplish the loading of the casing onto the skin dressing tube 4, where this is arranged in the gathered condition of FIGS. 1, 8, 9. The machine is then brought again in the position of FIG. 1.

Subsequently, after having loaded the minced meat 2 in the hopper of the feed pump 1, the latter is set in motion in order to output this minced meat 2 at constant velocity, through the outlet 3, to the skin dressing tube 4.

The minced meat 2 being pumped by the pump 1 fills and pushes forward the casing 5 forming the continuous sausage 50 (FIG. 8), that is subsequently engaged by the separation and feed device 6, whose pincers 22, 23 co-operate with each other two by two in order to advance and to nip periodically the sausage 50 so as to form a squeezing point 52 between the sausage 51 immediately downstream of the pincers 22, 23 and the continuous sausage that follows, and as a consequence between a sausage and another. The velocity of the separation and feed device 6 is obviously proportioned with that of the feed pump 1 in such a way as to obtain an optimised filling of the casing 5.

Immediately after the formation of each squeezing point 52, the skin dressing tube 4 starts rotating thus accomplishing the twist of the casing 5 upstream of the squeezing point 52 and thus realising and rendering definite a corresponding separation tang between sausages.

The beginning of the rotation of the skin dressing tube 4 is controlled by a proximity sensor 24 (FIG. 4), which is sensitive to the passage of the pincers 22 and which conveys an appropriate signal to the velocity-delay converter 45 of FIG. 13, in its turn supplied with a signal of velocity by the tachometric dynamo 44. In this way, the converter 45 calculates the moment 47 in which the pincers 22, 23 are to engage with each other and from which the period 46 of rotation of the skin dressing tube 4 initiates. The length of that period, from which the twisting turns depend, is adjusted by means of a potentiometer P.

I claim:

1. Machine to produce sausages with twisted casing, comprising a feeding pump for minced meat, a skin dressing tube located at the exit of said pump in order to sustain a flexible casing and to consent the introduction of meat into the casing itself for the formation of a continuous sausage, a device of separation and feed of the sausage provided with mobile pincers that can be brought near to each other in order to nip the casing and forming in this way a squeezing point between each sausage downstream and the rest of the sausage upstream, and controlling means for causing the rotation of the skin dressing tube for the twisting of the casing around said squeezing point in such a way as to obtain a separation tang between a sausage downstream and the rest of the sausage upstream, characterized in that said controlling means are synchronized with the movement of said pincers to start the rotation of said skin dressing tube only once a squeezing point has been formed and to maintain said squeezing point for predetermined period of time before forming a subsequent squeezing point.

2. Machine to produce sausages with twisted casing, comprising a feeding pump for minced meat, a skin dressing tube located at the exit of said pump in order to sustain a flexible casing and to consent the introduction of meat into the casing itself for the formation of a continuous sausage, a device of separation and feed of the sausage provided with mobile pincers that can be brought near to each other in order to nip the casing and forming in this way a squeezing point between each sausage downstream and the rest of the sausage upstream, and controlling means for causing the rotation of the skin dressing tube for the twisting of the casing around said squeezing point in such a way as to obtain a separation tang between a sausage downstream and the rest of the sausage upstream, characterized in that said controlling means are synchronized with the movement of said pincers in order to control the rotation of said skin dressing tube only for a predetermined period of time between the formation of a squeezing point and that of the subsequent squeezing point, a sensor is associated with said separation and feed device for detecting the passage of the pincers in a position near the one of the squeezing of said casing and controlling the start of the rotation of the skin dressing tube with a predefined delay corresponding at least to the time necessary for the pincers to reach the position of squeezing of the casing.

3. Machine according to claim 2, characterized in that said sensor is of proximity and it is sensitive to the passage of a metal disc provided on one of said pincers.

4. Machine according to claim 2, characterized in that it comprises a velocity-delay converter suitable to combine information on the velocity of said device of separation and feed to those of the passage of the pincers provided by said sensor, in order to generate a start signal of the rotation of the skin dressing tube, whose starting moment is calculated in such a way as to be equal or subsequent to the one in which the pincers reach said squeezing position.

5. Machine according to claim 1, characterized in that it comprises means (P) for the adjustment of said predetermined time.

6. Machine to produce sausages with twisted casing, comprising a feeding pump for minced meat, a skin dressing tube located at the exit of said pump in order to sustain a flexible casing and to consent the introduction of meat into the casing itself for the formation of a continuous sausage, a device of separation and feed of the sausage provided with mobile pincers that can be brought near to each other in order to nip the casing and forming in this way a squeezing point between each sausage downstream and the rest of the sausage upstream, and controlling means for causing the rotation of the skin dressing tube for the twisting of the casing around said squeezing point in such a way as to obtain a separation tang between a sausage downstream and the rest of the sausage upstream, characterized in that said controlling means are synchronized with the movement of said pincers in order to control the rotation of said skin dressing tube only for a predetermined period of time between the formation of a squeezing point and that of the subsequent squeezing point, said machine having means for the release of said device of separation and feed so as to allow the introduction of said casing on said skin dressing tube.

7. Machine according to claim 6, characterized in that said release means comprise a connecting rod, one of whose ends is pivoted in to an arm that leads to said device of separation and feed and it is crossed by said skin dressing tube, while the other end is rotatably mounted to a cylindrical hub eccentrically fixed on a maneuvering lever with a fixed fulcrum.

8. Machine according to claim 3, characterized in that it comprises a velocity-delay converter suitable to combine information on the velocity of said device of separation and feed to those of the passage of the pincers provided by said sensor, in order to generate a start signal of the rotation of the skin dressing tube, whose starting moment is calculated in such a way as to be equal or subsequent to the one in which the pincers reach said squeezing position.

9. Machine according to claim 2, characterized in that it comprises means (P) for the adjustment of said predetermined time.

10. Machine according to claim 3, characterized in that it comprises means (P) for the adjustment of said predetermined time.

11. Machine according to claim 4, characterized in that it comprises means (P) for the adjustment of said predetermined time.

12. Machine according to claim 2, characterized in that it is provided with means for the release of said device of separation and feed so as to allow the introduction of said casing on said skin dressing tube.

13. Machine according to claim 3, characterized in that it is provided with means for the release of said device of separation and feed so as to allow the introduction of said casing on said skin dressing tube.

14. Machine according to claim 4, characterized in that it is provided with means for the release of said device of separation and feed so as to allow the introduction of said casing on said skin dressing tube.

15. Machine to produce sausages with twisted casing, comprising a feeding pump for minced meat, a skin dressing tube located at the exit of said pump in order to sustain a flexible casing and to consent the introduction of meat into the casing itself for the formation of a continuous sausage, a device of separation and feed of the sausage provided with mobile pincers that can be brought near to each other in order to nip the casing and forming in this way a squeezing point between each sausage downstream and the rest of the sausage upstream, and controlling means for causing the rotation of the skin dressing tube for the twisting of the casing around said squeezing point in such a way as to obtain a separation tang between a sausage downstream and the rest of the sausage upstream, characterized in that said controlling means are synchronized with the movement of said pincers in order to control the rotation of said skin dressing tube only for a predetermined period of time between the formation of a squeezing point and that of the subsequent squeezing point, said machine having means (P) for the adjustment of said predetermined time, said machine having means for the release of said device of separation and feed so as to allow the introduction of said casing on said skin dressing tube.

* * * * *